US012273318B2

(12) United States Patent
K et al.

(10) Patent No.: US 12,273,318 B2
(45) Date of Patent: Apr. 8, 2025

(54) BROADBAND NETWORK GATEWAY (BNG) AS DYNAMIC HOST CONFIGURATION PROTOCOL (DHCP) SERVER

(71) Applicant: Juniper Networks, Inc., Sunnyvale, CA (US)

(72) Inventors: Kiran Kumar K, Bangalore (IN); Venkatesh Padebettu, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 18/501,293

(22) Filed: Nov. 3, 2023

(65) Prior Publication Data

US 2024/0146688 A1 May 2, 2024

Related U.S. Application Data

(63) Continuation of application No. 18/145,673, filed on Dec. 22, 2022, now Pat. No. 11,811,728.

(30) Foreign Application Priority Data

Aug. 8, 2022 (IN) .............................. 202241045179

(51) Int. Cl.
*H04L 61/5014* (2022.01)
*H04L 12/46* (2006.01)
*H04L 101/659* (2022.01)

(52) U.S. Cl.
CPC ...... *H04L 61/5014* (2022.05); *H04L 12/4633* (2013.01); *H04L 2101/659* (2022.05)

(58) Field of Classification Search
None
See application file for complete search history.

(56) References Cited

U.S. PATENT DOCUMENTS 11,032,743 B1 6/2021 Wong et al.
11,811,728 B1 11/2023 Kumar et al.
(Continued)

FOREIGN PATENT DOCUMENTS

CA 3103305 A1 12/2019
EP 3850906 B1 * 5/2024 ............ H04W 48/18
(Continued)

OTHER PUBLICATIONS

3rd Generation Partnership Project; Technical Specification Group Services and System Aspects; Study on the Wireless and Wireline Convergence for the 5G system architecture (Release 16), 3GPP Standard TR 23.716, No. V16.0.0, Dec. 19, 2018, XP051591215.
(Continued)

*Primary Examiner* — Phyllis A Book
(74) *Attorney, Agent, or Firm* — Harrity & Harrity, LLP

(57) ABSTRACT

In some implementations, a broadband network gateway (BNG) may receive, from a customer premises equipment, a dynamic host configuration protocol (DHCP) discover request, wherein the BNG is connected to the customer premises equipment and a fixed mobile interworking function (FMIF). The BNG may communicate with, based on the DHCP discover request, the FMIF. The BNG may provide to the customer premises equipment, and based on communicating with the FMIF, a DHCP offer that offers utilization of the BNG as a DHCP server. The BNG may receive from the customer premises equipment, and based on providing the DHCP offer, a DHCP request to request utilization of the BNG as the DHCP server. The BNG may provide to the customer premises equipment, and based on the DHCP request, a DHCP acknowledgment that acknowledges utilization of the BNG as the DHCP server.

20 Claims, 6 Drawing Sheets

(56) References Cited

U.S. PATENT DOCUMENTS

| | | | | |
|---|---|---|---|---|
| 2014/0355536 | A1* | 12/2014 | Muley | H04L 45/24 |
| | | | | 370/329 |
| 2015/0350912 | A1* | 12/2015 | Head | H04L 63/08 |
| | | | | 726/4 |
| 2016/0014071 | A1 | 1/2016 | Asati et al. | |
| 2016/0036922 | A1* | 2/2016 | Centemeri | H04L 67/141 |
| | | | | 370/328 |
| 2016/0308918 | A1* | 10/2016 | Muley | H04L 43/062 |
| 2017/0332421 | A1* | 11/2017 | Sternberg | H04L 12/4641 |
| 2018/0098374 | A1* | 4/2018 | Bhatnagar | H04W 4/18 |
| 2020/0128087 | A1 | 4/2020 | Yu et al. | |
| 2020/0163012 | A1* | 5/2020 | Zhu | H04W 12/06 |
| 2020/0228491 | A1* | 7/2020 | Bleidorn | H04L 61/5014 |
| 2021/0022041 | A1* | 1/2021 | Allan | H04L 12/66 |
| 2021/0297402 | A1* | 9/2021 | Wong | H04L 63/162 |
| 2022/0006810 | A1* | 1/2022 | Peng | H04L 47/825 |
| 2022/0030438 | A1* | 1/2022 | Song | H04W 24/04 |
| 2022/0086236 | A1* | 3/2022 | Zhang | H04L 67/146 |
| 2022/0103642 | A1* | 3/2022 | Yu | H04W 76/11 |
| 2022/0141176 | A1 | 5/2022 | Padebettu | |
| 2024/0039763 | A1* | 2/2024 | Wan | H04L 12/2878 |
| 2024/0276342 | A1* | 8/2024 | Dimitrovski | H04M 15/8214 |

FOREIGN PATENT DOCUMENTS

| | | | | |
|---|---|---|---|---|
| WO | WO-2015181677 A1 * | 12/2015 | | H04L 61/2007 |
| WO | 2021126508 A1 | 6/2021 | | |

OTHER PUBLICATIONS

Broadband Forum: "SD-420 R3 5G Fixed Mobile Convergence Study", Nov. 16, 2018, XP051563214.

Broadband Forum., "TR-459 Control and User Plane Separation for a Disaggregated BNG Issue: 1," BFTR, Jun. 2020, pp. 1-102.

Broadband Forum: "WT-470 5G FMC Architecture", Feb. 17, 2020, XP052456509.

Extended European Search Report for Application No. EP231596602, mailed on Dec. 21, 2023, 09 pages.

* cited by examiner

BROADBAND NETWORK GATEWAY (BNG) AS DYNAMIC HOST CONFIGURATION PROTOCOL (DHCP) SERVER

CROSS-REFERENCE TO RELATED APPLICATION

This application is a continuation of U.S. patent application Ser. No. 18/145,673, filed Dec. 22, 2022 (now U.S. Pat. No. 11,811,728), which claims priority to India Patent Application No. 202241045179, entitled "BROADBAND NETWORK GATEWAY (BNG) AS DYNAMIC HOST CONFIGURATION PROTOCOL (DHCP) SERVER," filed on Aug. 8, 2022, the entire contents of which are expressly incorporated herein by reference.

BACKGROUND

The dynamic host configuration protocol (DHCP) is a network management protocol used on Internet protocol (IP) networks, whereby a DHCP server dynamically assigns an IP address and other network configuration parameters to each device of the network, so that each device can communicate with other IP networks.

SUMMARY

In some implementations, a method includes receiving, by a broadband network gateway (BNG) and from a customer premises equipment, a DHCP discover request, wherein the BNG is connected to the customer premises equipment and a fixed mobile interworking function (FMIF); communicating with, based on the DHCP discover request, the FMIF; providing, by the BNG, to the customer premises equipment, and based on communicating with the FMIF, a DHCP offer that offers utilization of the BNG as a DHCP server; receiving, by the BNG, from the customer premises equipment, and based on providing the DHCP offer, a DHCP request to request utilization of the BNG as the DHCP server; and providing, by the BNG, to the customer premises equipment, and based on the DHCP request, a DHCP acknowledgment that acknowledges utilization of the BNG as the DHCP server.

In some implementations, a non-transitory computer-readable medium storing a set of instructions includes one or more instructions that, when executed by one or more processors of a BNG, cause the BNG to: receive, from a customer premises equipment, a DHCP discover request; provide, to the customer premises equipment, a DHCP offer that offers utilization of the BNG as a DHCP server; receive, from the customer premises equipment and based on providing the DHCP offer, a DHCP request to request utilization of the BNG as the DHCP server; and provide, to the customer premises equipment and based on the DHCP request, a DHCP acknowledgment that acknowledges utilization of the BNG as the DHCP server.

In some implementations, a BNG includes one or more memories; and one or more processors to: provide, to a customer premises equipment, a DHCP offer that offers utilization of the BNG as a DHCP server; receive, from the customer premises equipment, and based on providing the DHCP offer, a DHCP request to request utilization of the BNG as the DHCP server; and provide, to the customer premises equipment, and based on the DHCP request, a DHCP acknowledgment that acknowledges utilization of the BNG as the DHCP server.

DETAILED DESCRIPTION

Figure 1A:
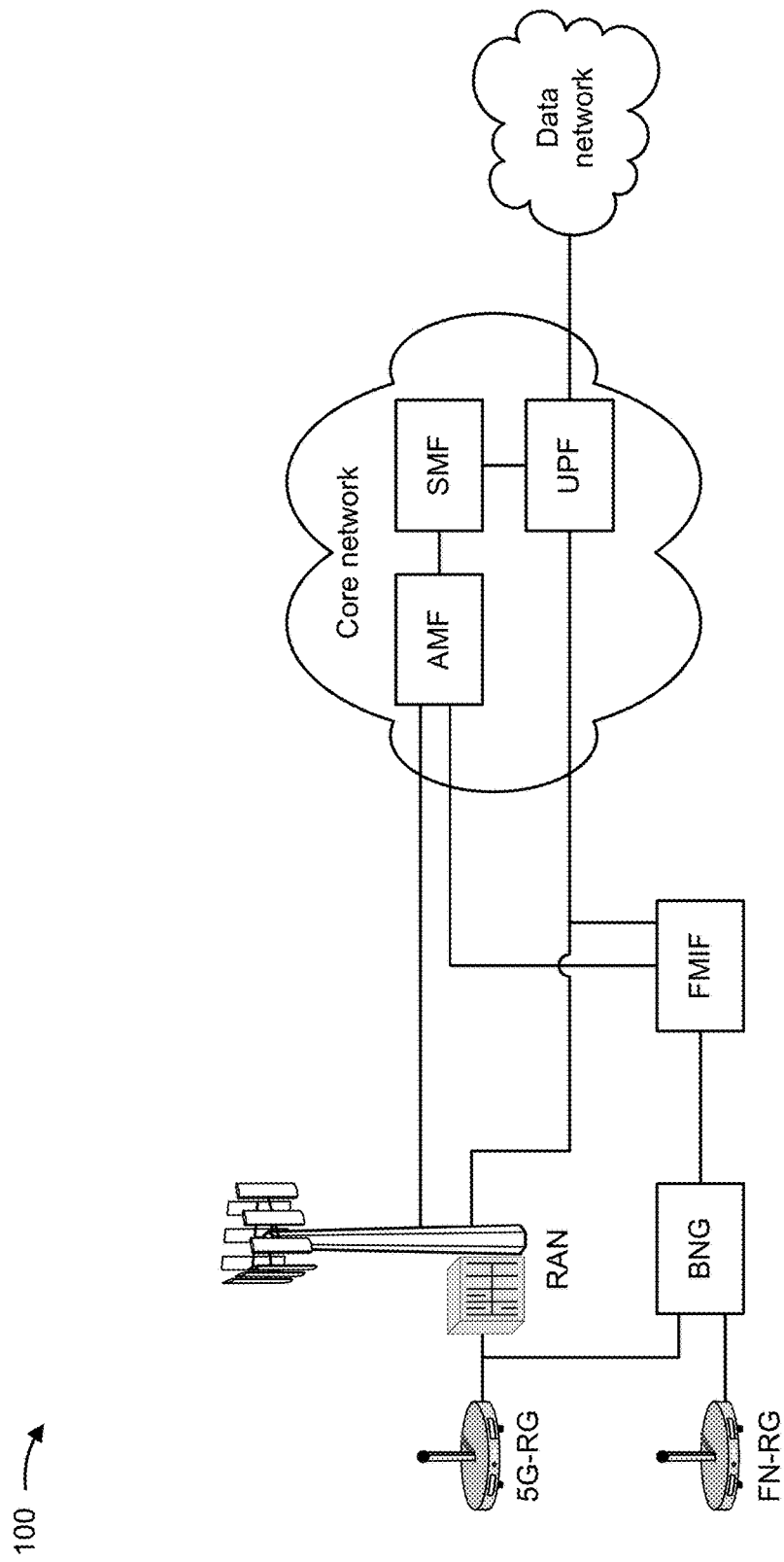
FIGS. 1A-1C are diagrams of an example implementation associated with supporting DHCP-based customer premises equipment in 5G wireline and wireless convergence in a deployment that utilizes a BNG and an FMIF.

The following detailed description of example implementations refers to the accompanying drawings. The same reference numbers in different drawings may identify the same or similar elements.

In many cases, a broadband network gateway (BNG) and a fixed mobile interworking function (FMIF) act as a dynamic host configuration protocol (DHCP) relay to support subscriber Internet protocol (IP) address and network parameters management for legacy DHCP-based customer premises equipment (CPE), such as a fixed network cable residential gateway (FN-RG). This requires the FMIF to use a method called IP address allocation using DHCP (e.g., an extended protocol configuration option (ePCO) with a container identifier (ID) of "0x000B [DHCPv4 based IP allocation]"). This forces the BNG and the FMIF to each be a stateful DHCP relay for the FN-RG. Instead of the 5G control plane (5GCP) providing the IP address and other network parameters (e.g., a gateway IP address, a domain name system (DNS) IP address, and/or the like), via non-access stratum (NAS) signaling, the 5GCP needs to support the DHCP server that supports the DHCP relay (e.g., the FMIF acting as a DHCP relay). However, such DHCP server support does not exist today in the 5GCP.

Furthermore, DHCP control packets sent by the FN-RG need to be carried over a pre-established (e.g., per CPE) general packet radio service (GPRS) tunneling protocol (GTP) tunnel that terminates on a user plane function (UPF), and then need to be sent to the 5GCP via another GTP tunnel. This creates a large overhead to support a data path of the DHCP control packets, due to multiple encapsulations and decapsulations (e.g., to allow the DHCP control packets to transmit via the GTP tunnels). Since a DHCP-associated resource lease can last for a long time (e.g., for at least a day, a week, a month, and/or a year, among other amounts of time), resources allocated in a data path often need to be reserved for a lifetime of the FN-RG. Additional protocols, such as the bidirectional forwarding detection (BFD) protocol, can be used for liveliness detection (e.g., to facilitate reclamation of unused resources), but fail to scale for a large quantity of CPEs (e.g., more than 200,000 CPEs).

The aforementioned causes DHCP packets to be transmitted to a session management function (SMF), via a UPF in the GTP tunnel. This introduces additional deep packet inspection in the FMIF to identify DHCP control packets inside the GTP tunnel (e.g., a user datagram protocol (UDP)-based tunnel). Also, additional DHCP packets for renewal and release need to be transmitted to the SMF via the UPF.

The FMIF has to perform encapsulation in an upstream direction and decapsulation in a downstream direction for the additional DHCP packets. Thus, the current configuration of the FMIF adds a large quantity of overhead in the FMIF and a large quantity of packets to be carried to and from the SMF, via the UPF, using the GTP tunnel. This, in turn, wastes computing resources (e.g., processing resources, memory resources, communication resources, and/or power resources, among other examples), networking resources, and/or other resources, associated with performing deep packet inspection, transmitting DHCP packets to the SMF via the UPF, encapsulating and/or decapsulating DHCP packets, and/or other actions.

Some implementations described herein relate to a BNG that supports DHCP-based CPEs in 5G wireline and wireless convergence. For example, the BNG may receive, from a CPE, a DHCP discover request that includes an identifier of the CPE. Accordingly, the BNG may provide a login request to the FMIF, which then may communicate with a first network device (e.g., an access and mobility management function (AMF)) to perform user equipment (UE) context setup (e.g., to aid in the registration the FMIF), identification setup (e.g., to identify the FMIF), authentication setup (e.g., to authenticate the FMIF), and/or protocol data unit (PDU) session setup (e.g., that establishes a PDU session for the CPE). The FMIF and a second network device (e.g., a UPF) then may establish a GTP tunnel associated with the PDU session and may then provide a login success to the BNG.

In some implementations, the BNG may provide, to the CPE and based on the login success, a DHCP offer that offers utilization of the BNG as a DHCP server. The CPE may generate a DHCP request that requests utilization of the BNG as the DHCP server, and may provide the DHCP request to the BNG. The BNG may provide, to the CPE, a DHCP acknowledgment (ACK) that acknowledges utilization of the BNG as the DHCP server by the CPE. The CPE may generate an address resolution protocol (ARP) request that requests an address (e.g., a gateway IP address), such as of the BNG, and may provide the ARP request to the BNG. The BNG may provide, to the CPE and based on the ARP request, an ARP response that includes the address of the BNG. Accordingly, an IP version 4 (IPv4) address, an IP version 4 (IPv6) address, or another address may be assigned to the CPE, and the BNG may map the address of the BNG to a PDU session identifier associated with the PDU session (e.g., that was established by the FMIF) based on the ARP response. Additionally, or alternatively, the BNG may enable data packets to be provided from the CPE to a data network, via the GTP tunnel, based on mapping the address of the BNG to the PDU session identifier.

In this way, the BNG supports DHCP-based CPEs in 5G wireline and wireless convergence. The BNG and the FMIF each reduce overhead in the FMIF, and in a network provided between the BNG, the FMIF, and other network devices, such as an SMF (e.g., via the UPF). For example, DHCP packets are transmitted only between the CPE and the BNG, which reduces traffic across the network and to and from the other network devices. This, in turn, conserves computing resources, networking resources, and/or other resources that would otherwise have been wasted in performing deep packet inspection, transmitting DHCP packets to the SMF via the UPF, encapsulating and/or decapsulating DHCP packets, and/or other actions.

Further, the FMIF may establish and utilize an NAS signaling method for allocation of an IP address for the CPE, which is in line with current 5GCP functional processes. In addition, a lease time for the IP address may be configurable to a short duration (e.g., less than a day), which may cause the CPE to frequently send DHCP renew requests, which can therefore be used for liveliness detection to facilitate reclamation of unused or underused resources.

Figure 1B:
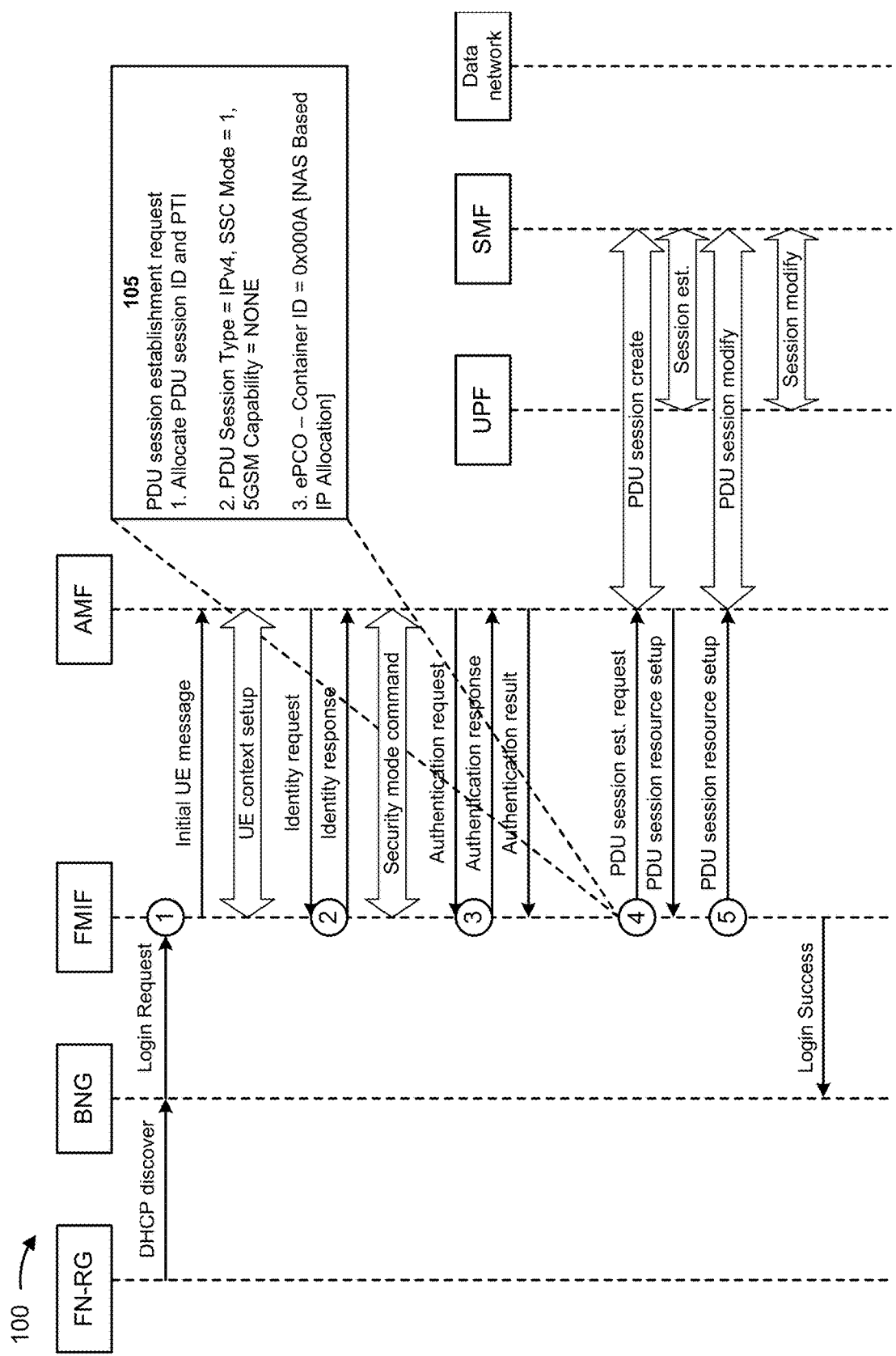
Figure 1C:
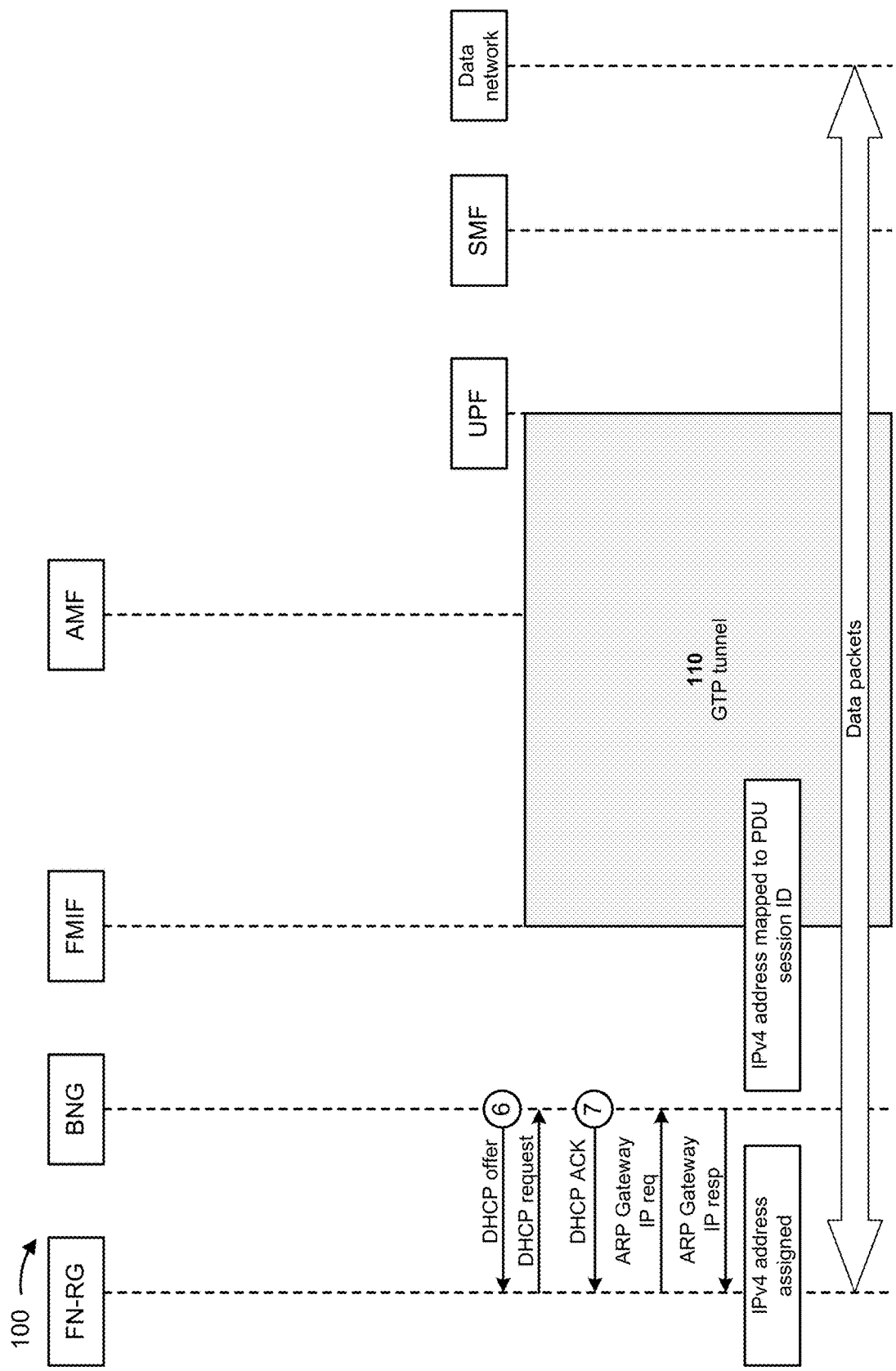

FIGS. 1A-1C are diagrams of an example implementation 100 associated with supporting DHCP-based customer premises equipment in 5G wireline and wireless convergence in a deployment that utilizes a BNG and an FMIF. As shown in FIGS. 1A-1C, example 100 includes CPE, such as a 5G residential gateway (5G-RG) and an FN-RG; a radio access network (RAN); a BNG; an FMIF; a core network that includes an access and mobility management function (AMF), an SMF, and a UPF; and a data network. The 5G-RG may include a device that combines a 5G modem and a Wi-Fi router into a single device. The FN-RG may include a network device (e.g., a router) that provides network access between local area network (LAN) hosts to a wide area network (WAN) (e.g., the Internet) via a modem.

The RAN may include one or more base stations (e.g., base transceiver stations, radio base stations, node Bs, eNodeBs (eNBs), gNodeB s (gNB s), base station subsystems, cellular sites, cellular towers, access points, transmit receive points (TRPs), radio access nodes, macrocell base stations, microcell base stations, picocell base stations, femtocell base stations, or similar types of devices) and other network entities that can support wireless communication for 5G-RG.

The BNG may include one or more devices configured as a DHCP server (e.g., as described herein) and may provide DHCP services (e.g., in association with the FMIF and the core network), such as for the FN-RG. The FMIF may include one or more devices configured to provide authentication, authorization, and accounting (AAA) services, and other services. The core network may include an example architecture of a 5G next generation (NG) core network included in a 5G wireless telecommunications system. The AMF may include one or more devices that act as a termination point for NAS signaling, mobility management, and/or other services. The SMF may include one or more devices that support the establishment, modification, and release of communication sessions in the wireless telecommunications system. The UPF may include one or more devices that serve as an anchor point for intraRAT and/or interRAT mobility. The data network may include one or more wired and/or wireless data networks.

As shown in FIG. 1A, the BNG may connect to the 5G-RG, the FN-RG, and the FMIF; the RAN may connect to the AMF and the UPF; the FMIF may connect to the BNG, the AMF, and the UPF; the AMF may connect to the RAN, the FMIF, and the SMF; the SMF may connect to the AMF and the UPF; and the UPF may connect to the RAN, the FMIF, the SMF, and the data network.

FIGS. 1B and 1C depict a call flow diagram for a packet flow (e.g., an Internet protocol version 4 packet flow or an Internet protocol version 6 packet flow). As shown in FIG. 1B, a CPE, such as the FN-RG, may generate a DHCP discover request that requests identification of a DHCP server to serve the FN-RG, and may provide the DHCP discover request to the BNG. The DHCP discover request may include, for example, an identifier of the FN-RG (e.g., a network address associated with the FN-RG, a universally unique identifier (UUID) associated with the FN-RG, and/or another type of identifier associated with the FN-RG. The BNG, based on receiving the DHCP discover request, may generate a login request, and may provide the login request to the FMIF. The login request may be a request for a context to be established for the FN-RG (e.g., to allow the FN-RG to connect to the core network) and may include, for example, the identifier of the FN-RG and/or an identifier of the BNG (e.g., a network address associated with the BNG, a UUID associated with the BNG, and/or another type of identifier associated with the BNG).

As indicated by step number 1, the FMIF may receive, from the BNG, the login request. The FMIF may provide, to the AMF and based on the login request, an initial user equipment (UE) message that requests registration of the FMIF (e.g., as associated with the FN-RG and/or the BNG). As further shown, the FMIF and the AMF may perform UE context setup to aid in the registration of the FMIF.

As indicated by step number 2, the FMIF may receive, from the AMF and based on the initial UE message (and/or the UE context setup), an identity request that requests identification of the FMIF. As further indicated by step number 2, the FMIF may provide, to the AMF and based on the identity request, an identity response that includes the identification of the FMIF. The identification of the FMIF may include, for example, an identifier of the FMIF (e.g., a network address associated with the FMIF, a UUID associated with the FMIF, and/or another type of identifier associated with the FMIF). The FMIF and the AMF may utilize security mode commands to aid in the registration of the FMIF.

As indicated by step number 3, the FMIF may receive, from the AMF and based on the identity response, an authentication request that requests authentication of the FMIF. As further indicated by step number 3, the FMIF may provide, to the AMF and based on the authentication request, an authentication response that includes the authentication of the FMIF. The AMF may receive the authentication response and may determine whether to authenticate the FMIF. If the AMF authenticates the FMIF, the AMF may provide, to the FMIF, an authentication result indicating that the FMIF is authenticated.

As indicated by step number 4, the FMIF may provide, to the AMF and based on the authentication response and/or the registration complete message, a PDU session establishment request that requests establishment of a PDU session for the FN-RG. For example, as indicated by reference number 105, the PDU session establishment request may include data requesting allocation of a PDU session identifier and a procedure transaction identity (PTI) (e.g., an identity that is allocated for PDU session establishment, modification, and release procedures); data identifying a PDU session type (e.g., IP version 4, with a session and service continuity (SSC) mode, and no 5G session management (5GSM) capability); data identifying an extended protocol configuration option (ePCO) with a container identifier (e.g., "0x000A") of an NAS-based IP allocation; and/or other data.

As further shown in FIG. 1B, the AMF may request that the SMF create the PDU session, and the UPF and the SMF may establish the PDU session based on the AMF request. The FMIF may receive, from the AMF and based on the PDU session establishment request, a PDU session resource setup request that requests a resource to be established for the PDU session. As indicated by step number 5, the FMIF may provide, to the AMF and based on the PDU session resource setup request, a PDU session resource setup response indicating that the resource is a GTP tunnel. As further shown, the AMF may request that the SMF modify the PDU session, and the UPF and the SMF may modify the PDU session based on the AMF request (e.g., to enable establishment of the GTP tunnel for the PDU session).

As further shown in FIG. 1B, the FMIF may provide, to the BNG and based on the PDU session resource setup response, a login success response (e.g., that is a response to the login request provided by the BNG to the FMIF). The login success response may indicate that a context is established for the FN-RG.

As shown in FIG. 1C, and by reference number 110, the FMIF and the UPF may establish the GTP tunnel requested by the PDU session resource setup request.

As indicated by step number 6, the BNG may provide, to the FN-RG, a DHCP offer that offers utilization of the BNG as a DHCP server (e.g., for the FN-RG). The DHCP offer may identify, for example, an address (e.g., an IP version 4 (IPv4) address, an IP version 4 (IPv6) address, or another type of address) that the FN-RG may use to access the core network. The FN-RG may generate a DHCP request and may provide the DHCP request to the BNG (e.g., based on the DHCP offer). The DHCP request may, for example, request utilization of the BNG as the DHCP server and/or that the FN-RG be assigned the address (e.g., that was identified by the DHCP offer). As indicated by step number 7, the BNG may provide, to the FN-RG, a DHCP acknowledgment (ACK) that acknowledges utilization of the BNG as the DHCP server for the FN-RG and/or that the FN-RG is assigned the address.

As further shown in FIG. 1C, the BNG may receive, from the FN-RG and based on the DHCP acknowledgment, an address resolution protocol (ARP) request that requests an address of the BNG (e.g., a gateway IP address of the BNG). The BNG may provide, to the FN-RG and based on the ARP request, an ARP response that includes the address of the BNG.

In some implementations, when an IPv4 address is assigned to the FN-RG, the BNG may map an IPv4 address of the BNG to the PDU session identifier (e.g., based on the ARP response). Alternatively, when an IPv6 address is assigned to the FN-RG, the BNG may map an IPv6 address of the BNG to the PDU session identifier (e.g., based on the ARP response). As further shown, the BNG may enable data packets to be provided from the FN-RG to the data network, via the GTP tunnel, based on mapping the address of the BNG to the PDU session identifier.

As indicated above, FIGS. 1A-1C are provided as an example. Other examples may differ from what is described with regard to FIGS. 1A-1C. The number and arrangement of devices shown in FIGS. 1A-1C are provided as an example. In practice, there may be additional devices, fewer devices, different devices, or differently arranged devices than those shown in FIGS. 1A-1C. Furthermore, two or more devices shown in FIGS. 1A-1C may be implemented within a single device, or a single device shown in FIGS. 1A-1C may be implemented as multiple, distributed devices. Additionally, or alternatively, a set of devices (e.g., one or more devices) shown in FIGS. 1A-1C may perform one or more functions described as being performed by another set of devices shown in FIGS. 1A-1C.

Figure 2:
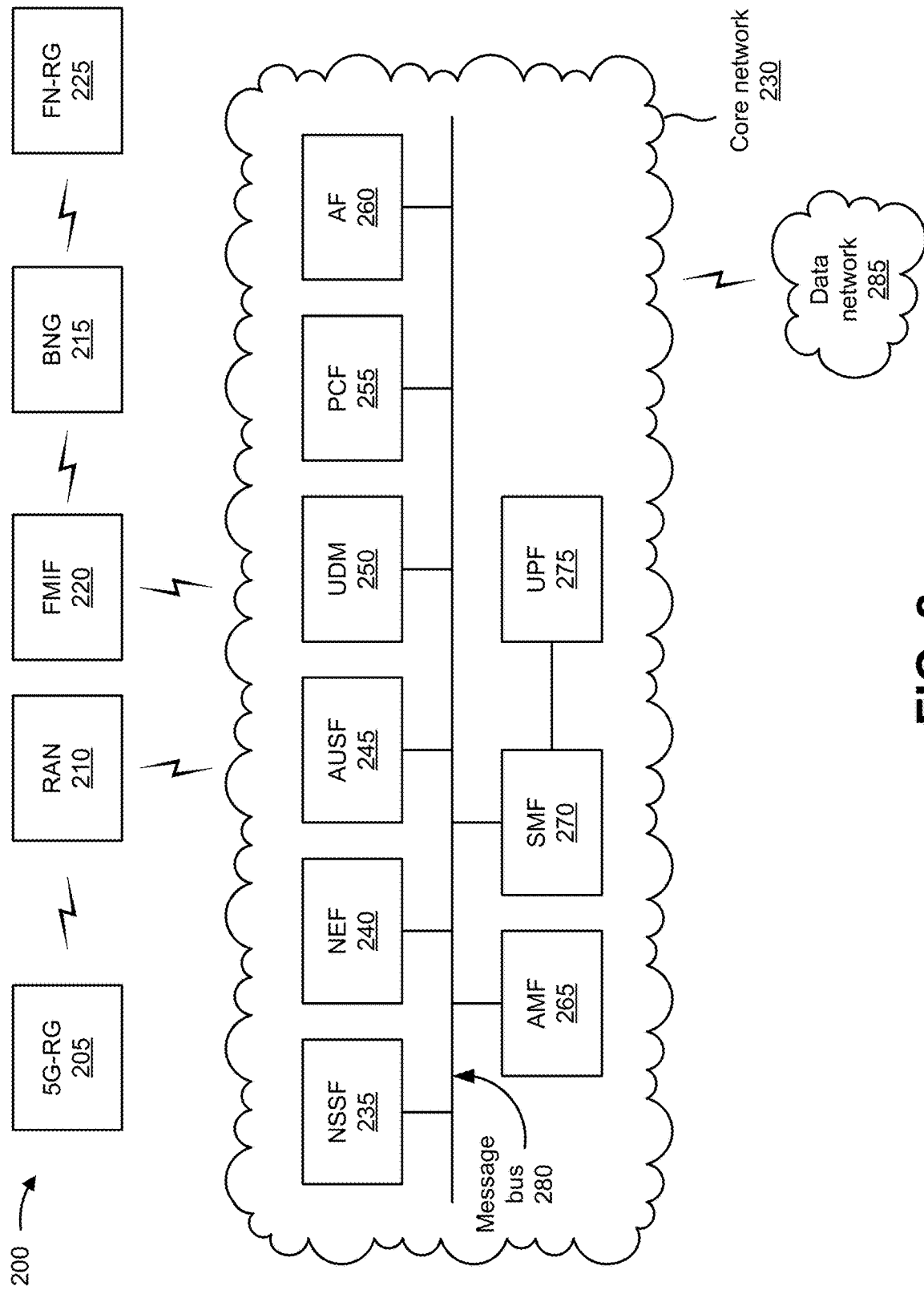
FIG. 2 is a diagram of an example environment in which systems and/or methods described herein may be implemented.

FIG. 2 is a diagram of an example environment 200 in which systems and/or methods described herein may be implemented. As shown in FIG. 2, example environment 200 may include a 5G-RG 205, a RAN 210, a BNG 215, an FMIF 220, an FN-RG 225, a core network 230, and a data network 285. Devices and/or networks of example environment 200 may interconnect via wired connections, wireless connections, or a combination of wired and wireless connections.

5G-RG 205 includes a device capable of receiving, generating, storing, processing, and/or providing information, such as information described herein. For example, 5G-RG 205 may include a device that combines a 5G modem and a Wi-Fi router into a single device, rather than using separate devices connected via cabling.

RAN 210 may support, for example, a cellular radio access technology (RAT). RAN 210 may include one or more base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, or similar types of devices) and other network entities that can support wireless communication for 5G-RG 205. RAN 210 may transfer traffic between 5G-RG 205 (e.g., using a cellular RAT), one or more base stations (e.g., using a wireless interface or a backhaul interface, such as a wired backhaul interface), and/or core network 230. RAN 210 may provide one or more cells that cover geographic areas.

In some implementations, RAN 210 may perform scheduling and/or resource management for 5G-RG 205 covered by RAN 210 (e.g., 5G-RG 205 covered by a cell provided by RAN 210). In some implementations, RAN 210 may be controlled or coordinated by a network controller, which may perform load balancing, network-level configuration, and/or the like. The network controller may communicate with RAN 210 via a wireless or wireline backhaul. In some implementations, RAN 210 may include a network controller, a self-organizing network (SON) module or component, or a similar module or component. In other words, RAN 210 may perform network control, scheduling, and/or network management functions (e.g., for uplink, downlink, and/or sidelink communications of 5G-RG 205 covered by RAN 210).

BNG 215 includes a device capable of receiving, generating, storing, processing, and/or providing information, such as information described herein. For example, BNG 215 may be configured as a DHCP server and provide DHCP services for 5G-RG 205 and FN-RG 225 (e.g., in association with FMIF 220 and core network 230).

FMIF 220 includes a device capable of receiving, generating, storing, processing, and/or providing information, such as information described herein. For example, BNG 215 may provide authentication, authorization, and accounting (AAA) services plus hierarchical traffic shaping and policing for 5G-RG 205 and FN-RG 225 served from UPF 275 within core network 230. While policy and subscriber databases are distinct elements in wireline broadband networks, the adoption of a 5G service based architecture (SBA) enables resources, such as a policy control function (PCF) 255 and an authentication server function (AUSF) 245, to be shared across mobile, fixed wireless, and wireline access networks. The 5G SBA also supports shared supporting infrastructure, such as an IP multimedia subsystem (IMS) for rich multimedia service delivery.

FN-RG 225 includes a device capable of receiving, generating, storing, processing, and/or providing information, such as information described herein. For example, FN-RG 225 may include a router that provides network access between local area network (LAN) hosts to a wide area network (WAN) (e.g., the Internet) via a modem. The modem may or may not be integrated into the hardware of FN-RG 225. The WAN may be a larger computer network, generally operated by an Internet service provider.

In some implementations, core network 230 may include an example functional architecture in which systems and/or methods described herein may be implemented. For example, core network 230 may include an example architecture of a fifth generation (5G) next generation (NG) core network included in a 5G wireless telecommunications system. While the example architecture of core network 230 shown in FIG. 2 may be an example of a service-based architecture, in some implementations, core network 230 may be implemented as a reference-point architecture, a 4G core network, and/or the like.

As shown in FIG. 2, core network 230 may include a number of functional elements. The functional elements may include, for example, a network slice selection function (NSSF) 235, a network exposure function (NEF) 240, an authentication server function (AUSF) 245, a unified data management (UDM) component 250, a policy control function (PCF) 255, an application function (AF) 260, an access and mobility management function (AMF) 265, a session management function (SMF) 270, a user plane function (UPF) 275, and/or the like. These functional elements may be communicatively connected via a message bus 280. Each of the functional elements shown in FIG. 2 is implemented on one or more devices associated with a wireless telecommunications system. In some implementations, one or more of the functional elements may be implemented on physical devices, such as an access point, a base station, a gateway, and/or the like. In some implementations, one or more of the functional elements may be implemented on a computing device of a cloud computing environment.

NSSF 235 includes one or more devices that select network slice instances for 5G-RG 205. By providing network slicing, NSSF 235 allows an operator to deploy multiple substantially independent end-to-end networks potentially with the same infrastructure. In some implementations, each slice may be customized for different services.

NEF 240 includes one or more devices that support exposure of capabilities and/or events in the wireless telecommunications system to help other entities in the wireless telecommunications system discover network services.

AUSF 245 includes one or more devices that act as an authentication server and support the process of authenticating 5G-RG 205 in the wireless telecommunications system.

UDM 250 includes one or more devices that store user data and profiles in the wireless telecommunications system. UDM 250 may be used for fixed access, mobile access, and/or the like, in core network 230.

PCF 255 includes one or more devices that provide a policy framework that incorporates network slicing, roaming, packet processing, mobility management, and/or the like.

AF 260 includes one or more devices that support application influence on traffic routing, access to NEF 240, policy control, and/or the like.

AMF 265 includes one or more devices that act as a termination point for non-access stratum (NAS) signaling, mobility management, and/or the like.

SMF 270 includes one or more devices that support the establishment, modification, and release of communication sessions in the wireless telecommunications system. For example, SMF 270 may configure traffic steering policies at UPF 275, enforce user equipment IP address allocation and policies, and/or the like.

UPF 275 includes one or more devices that serve as an anchor point for intraRAT and/or interRAT mobility. UPF 275 may apply rules to packets, such as rules pertaining to packet routing, traffic reporting, handling user plane QoS, and/or the like.

Message bus 280 represents a communication structure for communication among the functional elements. In other words, message bus 280 may permit communication between two or more functional elements.

Data network 285 includes one or more wired and/or wireless data networks. For example, data network 285 may include an IP Multimedia Subsystem (IMS), a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of example environment 200 may perform one or more functions described as being performed by another set of devices of example environment 200.

Figure 3:
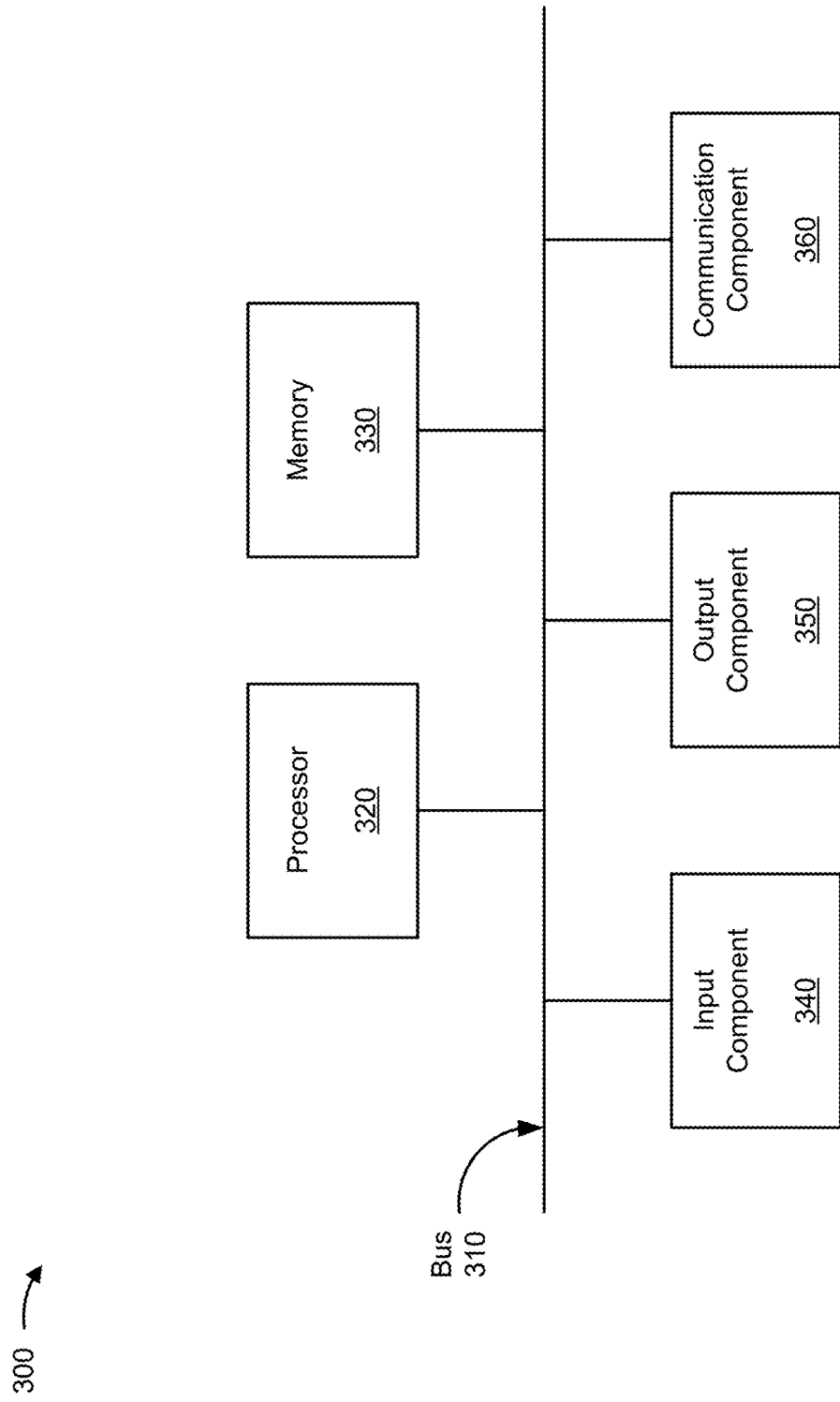
FIG. 3 is a diagram of example components of a device associated with supporting DHCP-based customer premises equipment in 5G wireline and wireless convergence in a deployment that utilizes a BNG and an FMIF.

FIG. 3 is a diagram of example components of a device 300 associated with supporting DHCP-based customer premises equipment in 5G wireline and wireless convergence in a deployment that utilizes a BNG and an FMIF. The device 300 may correspond to 5G-RG 205, AN 215, BNG 215, FMIF 220, FN-RG 225, NSSF 235, NEF 240, AUSF 245, UDM 250, PCF 255, AF 260, AMF 265, SMF 270, and/or UPF 275. In some implementations, 5G-RG 205, AN 215, BNG 215, FMIF 220, FN-RG 225, NSSF 235, NEF 240, AUSF 245, UDM 250, PCF 255, AF 260, AMF 265, SMF 270, and/or UPF 275 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
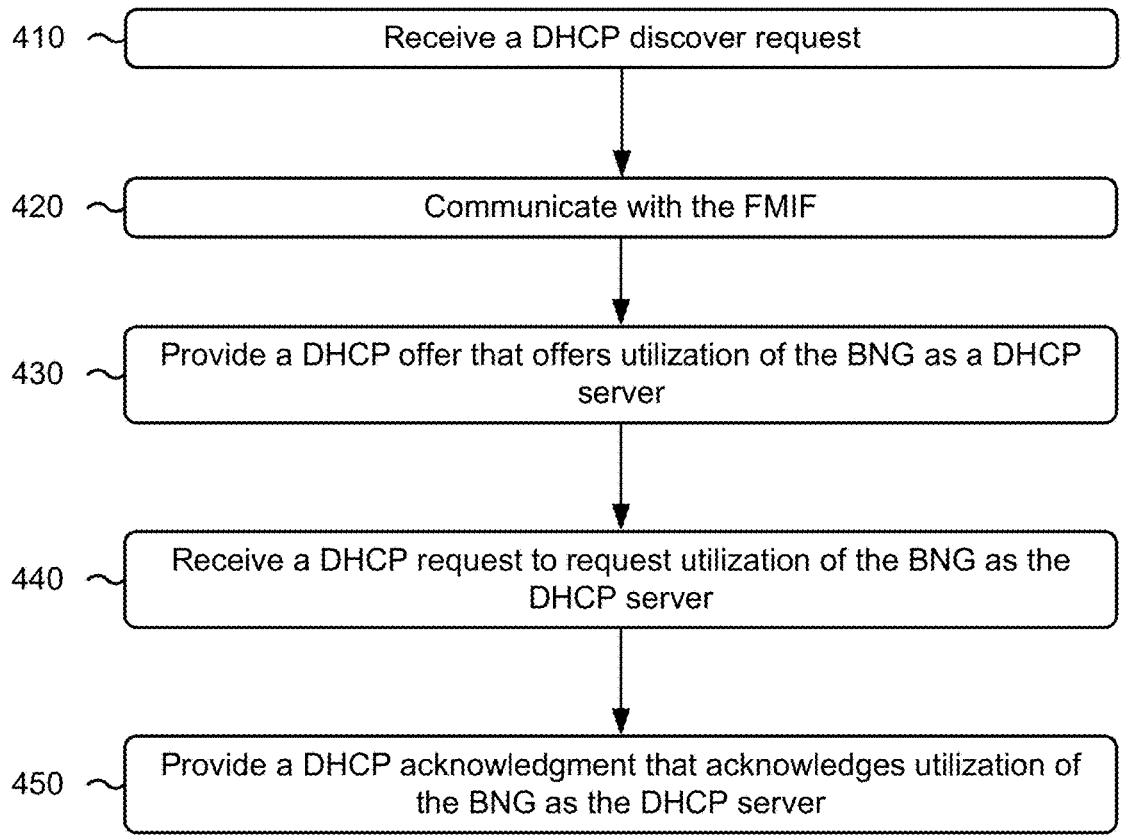
FIG. 4 is a flowchart of an example process associated with supporting DHCP-based customer premises equipment in 5G wireline and wireless convergence in a deployment that utilizes a BNG and an FMIF.

FIG. 4 is a flowchart of an example process 400 associated with supporting DHCP-based customer premises equipment in 5G wireline and wireless convergence in a deployment that utilizes a BNG and an FMIF. In some implementations, one or more process blocks of FIG. 4 are performed by a BNG (e.g., BNG 215). In some implementations, one or more process blocks of FIG. 4 are performed by another device or a group of devices separate from or including the BNG, such as an FMIF (e.g., FMIF 220), or a device or group of devices in a core network (e.g., core network 230). Additionally, or alternatively, one or more process blocks of FIG. 4 may be performed by one or more components of device 300, such as processor 320, memory 330, input component 340, output component 350, and/or communication component 360.

As shown in FIG. 4, process 400 may include receiving a DHCP discover request (block 410). For example, the BNG may receive, from a customer premises equipment, a DHCP discover request, as described above. In some implementations, the BNG is connected to the customer premises equipment and an FMIF.

As further shown in FIG. 4, process 400 may include communicating with the FMIF (block 420). For example, the BNG may communicate with (e.g., based on the DHCP discover request) the FMIF, as described above.

As further shown in FIG. 4, process 400 may include providing a DHCP offer that offers utilization of the BNG as a DHCP server (block 430). For example, the BNG may provide to the customer premises equipment (e.g., based on communicating with the FMIF) a DHCP offer that offers utilization of the BNG as a DHCP server, as described above.

As further shown in FIG. 4, process 400 may include receiving a DHCP request to request utilization of the BNG as the DHCP server (block 440). For example, the BNG may receive from the customer premises equipment (e.g., based on providing the DHCP offer) a DHCP request to request utilization of the BNG as the DHCP server, as described above.

As further shown in FIG. 4, process 400 may include providing a DHCP acknowledgment that acknowledges utilization of the BNG as the DHCP server (block 450). For example, the BNG may provide to the customer premises equipment (e.g., based on the DHCP request) a DHCP acknowledgment that acknowledges utilization of the BNG as the DHCP server, as described above.

Process 400 may include additional implementations, such as any single implementation or any combination of implementations described below and/or in connection with one or more other processes described elsewhere herein.

In a first implementation, the customer premises equipment is a fixed network cable residential gateway.

In a second implementation, alone or in combination with the first implementation, the DHCP acknowledgment indicates that the customer premises equipment is assigned an IPv4 address. The BNG may assign the customer premises equipment the IPv4 address based on the DHCP request.

In a third implementation, alone or in combination with one or more of the first and second implementations, the DHCP acknowledgment indicates that the customer premises equipment is assigned an Internet protocol version 6 (IPv6) address. The BNG may assign the customer premises equipment the IPv6 address based on the DHCP request.

In a fourth implementation, alone or in combination with one or more of the first through third implementations, communicating with the FMIF allows the FMIF to cause a context to be established for the customer premises equipment, a protocol data unit (PDU) session to be established for the customer premises equipment, and/or a general packet radio service (GPRS) tunneling protocol (GTP) tunnel to be established for the customer premises equipment.

In a fifth implementation, alone or in combination with one or more of the first through fourth implementations, communicating with the FMIF comprises providing, to the FMIF, a login request, and receiving, from the FMIF and based on providing the login request, a login success response, wherein receiving the login success response allows the BNG to provide the DHCP offer to the customer premises equipment.

In a sixth implementation, alone or in combination with one or more of the first through fifth implementations, process 400 includes receiving, based on providing the DHCP acknowledgment, an ARP request that requests an address of the BNG; providing, to the customer premises equipment, and based on the ARP request, an ARP response that includes the address of the BNG; and mapping, based on providing the ARP response, the address of the BNG to a PDU session identifier of a PDU session established for the customer premises equipment.

In a seventh implementation, alone or in combination with one or more of the first through sixth implementations, process 400 includes enabling data packets to be provided from the customer premises equipment to a data network, such as via a GTP tunnel, based on mapping the address of the BNG to the PDU session identifier.

Although FIG. 4 shows example blocks of process 400, in some implementations, process 400 includes additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, traffic or content may include a set of packets. "Packet" may refer to a communication structure for communicating information, such as a protocol data unit (PDU), a service data unit (SDU), a network packet, a datagram, a segment, a message, a block, a frame (e.g., an Ethernet frame), a portion of any of the above, and/or another type of formatted or unformatted unit of data capable of being transmitted via a network.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
receiving, by a broadband network gateway (BNG), from a customer premises equipment, and based on providing a dynamic host configuration protocol (DHCP) offer that identifies an address, a DHCP request to request utilization of the BNG as a DHCP server and request that the customer premises equipment be assigned the address; and
providing, by the BNG, to the customer premises equipment, and based on the DHCP request, a DHCP acknowledgment that acknowledges utilization of the BNG as the DHCP server and that the customer premises equipment is assigned the address.

2. The method of claim 1, wherein the customer premises equipment is a fixed network cable residential gateway.

3. The method of claim 1, wherein the address is an Internet protocol version 4 (IPv4) address.

4. The method of claim 1, wherein the address is an Internet protocol version 6 (IPv6) address.

5. The method of claim 1, further comprising:
communicating with a fixed mobile interworking function (FMIF) to allow the FMIF to cause:
a context to be established for the customer premises equipment;
a protocol data unit (PDU) session to be established for the customer premises equipment; and
a general packet radio service (GPRS) tunneling protocol (GTP) tunnel to be established for the customer premises equipment.

6. The method of claim 5, wherein communicating with the FMIF comprises:
providing, to the FMIF, a login request; and
receiving, from the FMIF and based on providing the login request, a login success response,
wherein receiving the login success response allows the BNG to provide the DHCP offer to the customer premises equipment.

7. The method of claim 1, further comprising:
receiving, based on providing the DHCP acknowledgment, an address resolution protocol (ARP) request that requests an address of the BNG;
providing, to the customer premises equipment, and based on the ARP request, an ARP response that includes the address of the BNG; and
mapping, based on providing the ARP response, the address of the BNG to a protocol data unit (PDU) session identifier of a PDU session established for the customer premises equipment.

8. The method of claim 7, further comprising:
enabling data packets to be provided from the customer premises equipment to a data network, via a general packet radio service (GPRS) tunneling protocol (GTP) tunnel, based on mapping the address of the BNG to the PDU session identifier.

9. A non-transitory computer-readable medium storing a set of instructions, the set of instructions comprising:
one or more instructions that, when executed by one or more processors of a broadband network gateway (BNG), cause the BNG to:
receive, from customer premises equipment and based on providing a dynamic host configuration protocol (DHCP) offer that identifies an address, a DHCP request to request utilization of the BNG as a DHCP server and request that the customer premises equipment be assigned the address; and
provide, to the customer premises equipment and based on the DHCP request, a DHCP acknowledgment that acknowledges utilization of the BNG as the DHCP server that that the customer premises equipment is assigned the address.

10. The non-transitory computer-readable medium of claim 9, wherein the customer premises equipment is a fixed network cable residential gateway.

11. The non-transitory computer-readable medium of claim 9, wherein the address is an Internet protocol version 4 (IPv4) address.

12. The non-transitory computer-readable medium of claim 9, wherein address is an Internet protocol version 6 (IPv6) address.

13. The non-transitory computer-readable medium of claim 9, wherein the one or more instructions further cause the BNG to:
communicate with a fixed mobile interworking function (FMIF) to allow the FMIF to cause at least one of:
a context to be established for the customer premises equipment;
a protocol data unit (PDU) session to be established for the customer premises equipment; or
a general packet radio service (GPRS) tunneling protocol (GTP) tunnel to be established for the customer premises equipment.

14. The non-transitory computer-readable medium of claim 9, wherein the one or more instructions further cause the BNG to:
provide, to a fixed mobile interworking function (FMIF), a login request; and
receive, from the FMIF and based on providing the login request, a login success response,
wherein receiving the login success response allows the BNG to provide the DHCP offer to the customer premises equipment.

15. The non-transitory computer-readable medium of claim 9, wherein the one or more instructions further cause the BNG to:
receive, based on providing the DHCP acknowledgment, an address resolution protocol (ARP) request that requests an address of the BNG;
provide, to the customer premises equipment, and based on the ARP request, an ARP response that includes the address of the BNG; and
map, based on providing the ARP response, the address of the BNG to a protocol data unit (PDU) session identifier of a PDU session established for the customer premises equipment.

16. A broadband network gateway (BNG), comprising:
one or more memories; and
one or more processors to:
- receive, from customer premises equipment and based on providing a dynamic host configuration protocol (DHCP) offer that identifies an address, a DHCP request to request utilization of the BNG as a DHCP server and request that the customer premises equipment be assigned the address; and
- provide, to the customer premises equipment, and based on the DHCP request, a DHCP acknowledgment that acknowledges utilization of the BNG as the DHCP server and that the customer premises equipment is assigned the address.

17. The BNG of claim 16, wherein the one or more processors are further to:
communicate with a fixed mobile interworking function (FMIF) to allow the FMIF to cause at least one of:
- a context to be established for the customer premises equipment;
- a protocol data unit (PDU) session to be established for the customer premises equipment; or
- a general packet radio service (GPRS) tunneling protocol (GTP) tunnel to be established for the customer premises equipment.

18. The BNG of claim 16, wherein the customer premises equipment is a fixed network cable residential gateway.

19. The BNG of claim 16, wherein the address is an Internet protocol version 4 (IPv4) address.

20. The BNG of claim 16, wherein the address is an Internet protocol version 6 (IPv6) address.

* * * * *